(12) United States Patent
Kim

(10) Patent No.: US 8,469,576 B2
(45) Date of Patent: Jun. 25, 2013

(54) LIGHT SOURCE AND DISPLAY DEVICE HAVING THE SAME

(75) Inventor: Moon Jeong Kim, Osan-si (KR)

(73) Assignee: LG Innotek Co., Ltd., Seoul (KR)

( * ) Notice: Subject to any disclaimer, the term of this patent is extended or adjusted under 35 U.S.C. 154(b) by 617 days.

(21) Appl. No.: 12/702,415

(22) Filed: Feb. 9, 2010

(65) Prior Publication Data

US 2010/0232141 A1 Sep. 16, 2010

(30) Foreign Application Priority Data

Mar. 10, 2009 (KR) .................... 10-2009-0020063

(51) Int. Cl.
*F21V 7/04* (2006.01)

(52) U.S. Cl.
USPC ............................. 362/616; 362/612; 349/61

(58) Field of Classification Search
USPC .................................................. 362/616
See application file for complete search history.

(56) References Cited

U.S. PATENT DOCUMENTS

| 2001/0017774 A1 | 8/2001 | Ito et al. |
| 2006/0221638 A1 | 10/2006 | Chew et al. |
| 2007/0247869 A1 | 10/2007 | Lang et al. |
| 2007/0247871 A1 | 10/2007 | Yoo |
| 2008/0074902 A1 | 3/2008 | Oh et al. |
| 2008/0101068 A1* | 5/2008 | Kitamura et al. ............. 362/246 |
| 2010/0134718 A1 | 6/2010 | Ajichi et al. |

FOREIGN PATENT DOCUMENTS

| EP | 1 918 768 | 5/2008 |
| EP | 2 138 762 | 12/2009 |
| JP | 2001-305538 | 10/2001 |
| JP | 2008-108622 | 5/2008 |
| JP | 2008-112610 | 5/2008 |
| KR | 2001-0085460 | 9/2001 |
| KR | 10-2006-0106770 | 10/2006 |
| KR | 10-2006-0106774 | 10/2006 |
| KR | 10-2007-0104149 | 10/2007 |
| KR | 10-0780205 | 11/2007 |
| WO | WO-2009/017066 A1 * | 2/2009 |
| WO | WO 2009/017072 | 2/2009 |
| WO | WO 2009/145548 | 12/2009 |

OTHER PUBLICATIONS

European Search Report issued in EP Application No. 10155689.2 dated Jun. 21, 2010.
Korean Office Action issued in KR Application No. 10-2009-0020063 dated Jun. 28, 2010.
Korean Office Action issued in KR Application No. 10-2009-0020063 dated Dec. 29, 2010.

* cited by examiner

*Primary Examiner* — Sean Gramling
(74) *Attorney, Agent, or Firm* — KED & Associates, LLP

(57) ABSTRACT

A light source and a display device having the same are provided. The light source may include light guide plates arranged in rows and columns, light emitting diodes (LEDs) positioned below the light guide plates to direct light toward lateral surfaces of the light guide plates, and module substrates that support and provide power to the LEDs. Each of the light guide plates may include a first region divided into a plurality of second regions. LEDs corresponding to each of the second regions may be operated as a unit and independently from other regions.

21 Claims, 5 Drawing Sheets

LIGHT SOURCE AND DISPLAY DEVICE HAVING THE SAME

CROSS-REFERENCE TO RELATED APPLICATIONS

This claims priority under 35 U.S.C. §119(e) to Korean Patent Application No. 10-2009-0020063 (filed in Korea on Mar. 10, 2009), the entirety of which is incorporated herein by reference.

BACKGROUND

1. Field

This relates to a light source and a display device having the same.

2. Background

A light emitting diode (LED) may employ compound semiconductor materials such as GaAS-based materials, AlGaAs-based materials, GaN-based materials, InGaN-based materials, and InGaAlP-based materials. An LED may be packaged and used as a light emitting device to emit various colors. Such a light emitting device is used as a light source in various fields such as, for example, an on/off display for displaying colors, an alphanumeric display, an image display, and other such display devices.

BRIEF DESCRIPTION OF THE DRAWINGS

The embodiments will be described in detail with reference to the following drawings in which like reference numerals refer to like elements wherein.

DETAILED DESCRIPTION

Figure 1:
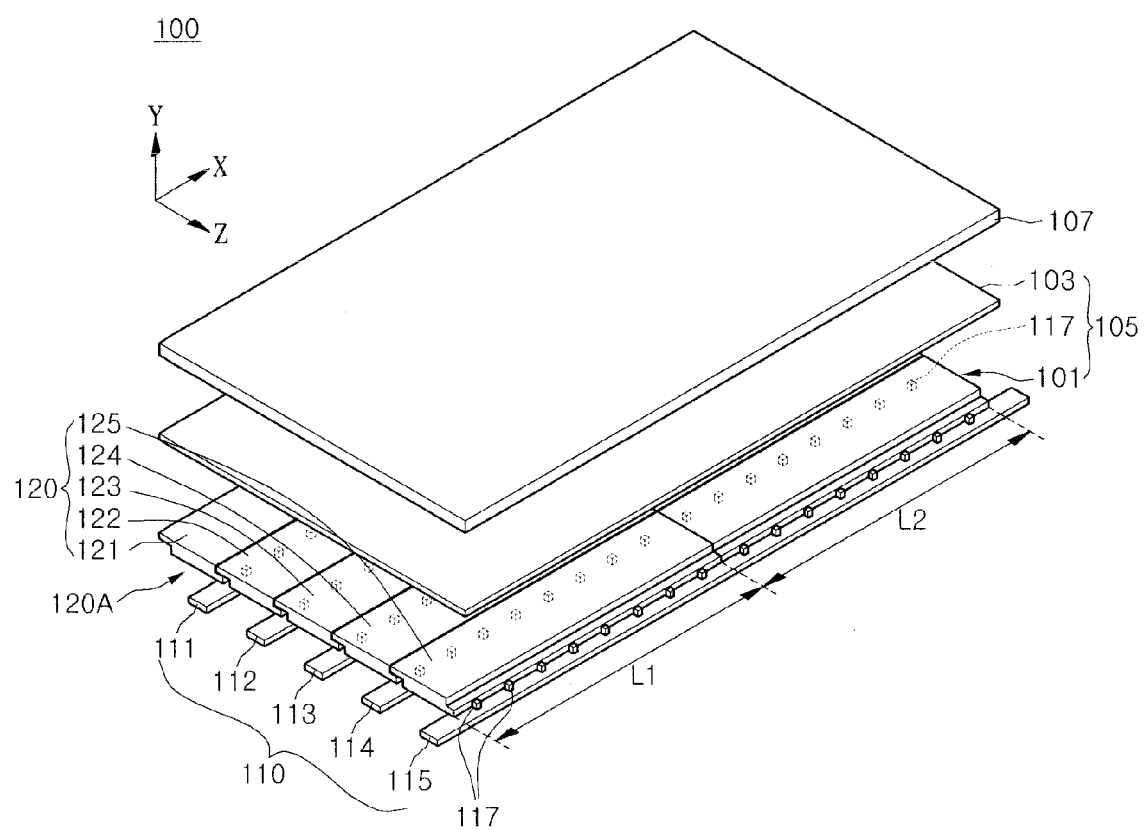
FIG. 1 is a perspective view of a display device according to an embodiment as broadly described herein.
Figure 2:
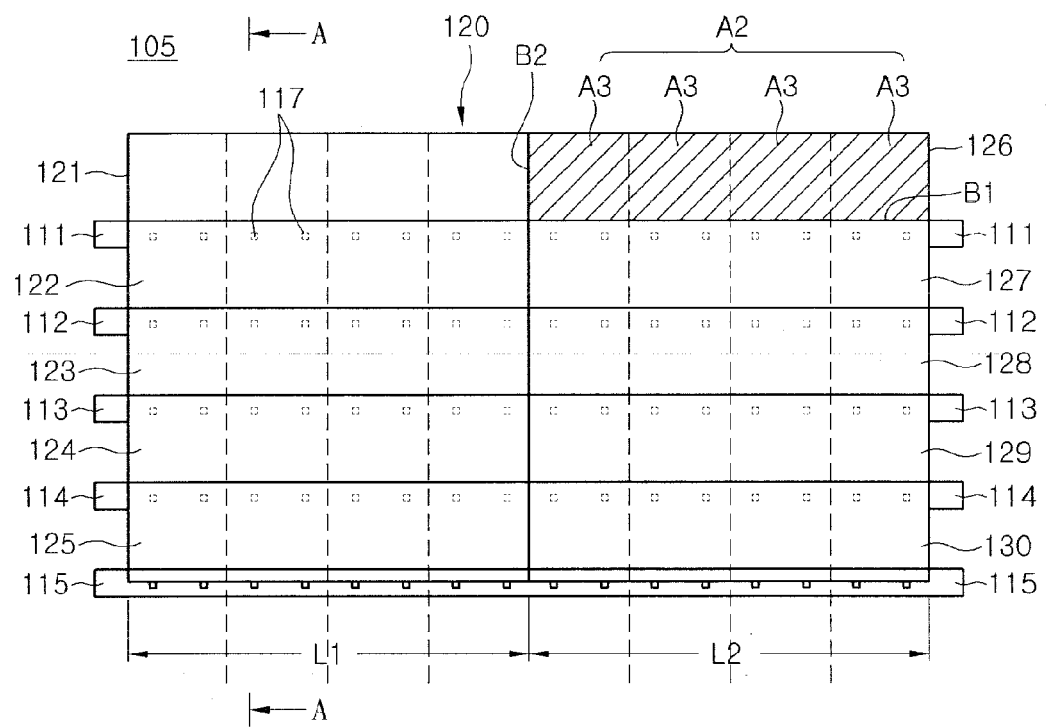
FIG. 2 is a plan view of a surface light source of the display device shown in FIG. 1.
Figure 3:
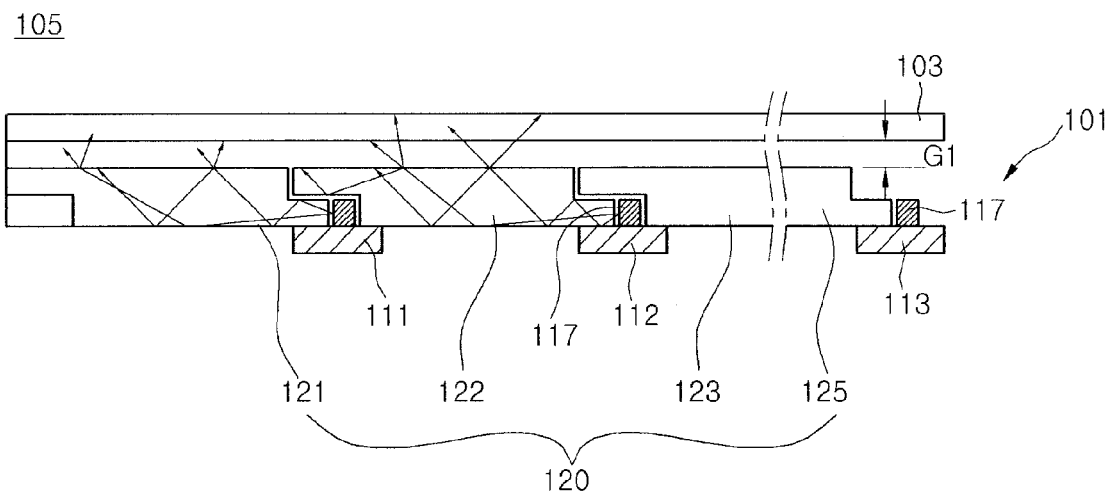
FIG. 3 is a side sectional view taken along line A-A of FIG. 2.

Referring to FIGS. 1 to 3, a display device 100 as embodied and broadly described herein may include a light source 105 including a surface light 101 and an optical sheet 103, and a display panel 107 disposed on the light source 105.

The surface light 101 may include a plurality of light emitting diodes (LEDs) 117, a module substrate 110 that supports and provides power to the plurality of LEDs 117, and a light guide plate 120 disposed on the plurality of LEDs 117 to radiate light incident on lateral surfaces of the light guide plate 120 to a top surface thereof.

In certain embodiments, the module substrate 110 may be provided in plurality. For example, the module substrate 110 shown in FIGS. 1 and 2 includes a first module substrate 111, a second module substrate 112, a third module substrate 113, a fourth module substrate 114, and a fifth module substrate 115. The module substrate 110 may also include a control chip to control the plurality of LEDs 117 or, in the alternative, may be electrically connected to an external control chip.

In certain embodiments, the light guide plate 120 may be provided in plurality. For example, the light guide plate 120 shown in FIGS. 1 and 2 includes a first light guide plate 121, a second light guide plate 122, a third light guide plate 123, a fourth light guide plate 124, a fifth light guide plate 125, a sixth light guide plate 126, a seventh light guide plate 127, a eighth light guide plate 128, a ninth light guide plate 129, and a tenth light guide plate 130.

The display panel 107 is configured to display images using light irradiated by the light source 105. The display panel 107 may be, for example, an LCD panel.

The optical sheet 103 may be disposed below the display panel 107 and may include at least one of a diffusion sheet and/or a prism sheet. The diffusion sheet diffuses light radiated from the surface light source 101 to generate light having uniform luminance. The prism sheet may include at least one of a horizontal prism sheet and a vertical prism sheet to condense the light, thereby improving luminance.

The type and number of optical sheet(s) 103 may be determined and revised within a technical range of this embodiment, but is not limited thereto. In alternative embodiments, the optical sheet 103 may not be necessary, and thus, in certain circumstances the optical sheet 103 may not be provided based on a particular design of the light source 105.

The plurality of light guide plates 120 may be positioned within a light emitting region. In this embodiment, the ten light guide plates 120 are used as an example. The plurality of light guide plates 120 may be closely attached to each other and positioned in a first direction (I.e., end to end in a row) within a boundary region B2. Portions of the plurality of light guide plates 120 may overlap each other in an overlap region B1 extending in a second direction (i.e., corresponding edge3s of adjacent light guide plates 120 arranged in a column). In this embodiment, the first direction represents a horizontal direction having a long length in a light emitting region having a rectangular shape, and the second direction represents a vertical direction having a short length in the light emitting region having the rectangular shape, as shown in FIG. 2.

N light guide plates 120 may be disposed in the first direction so as to form a row, and M light guide plates 120 may be disposed in the second direction so as to form a column. In this embodiment, the number M (the number of light guide plates 120 arranged in a particular column) may be a natural number greater or equal to the number N (the number of light guide plates 120 arranged in a particular row). For example, in this embodiment, two light guide plates 120 are disposed in the first direction, and five light guide plates 120 are disposed in the second direction.

The light guide plate 120 may have a substantially rectangular shape in which a length in the first direction is greater than that in the second direction. In alternative embodiments, the light guide plate 120 may have a different polygonal shape, such as, for example, a triangular shape, a hexagonal shape, or other shape as appropriate.

in this embodiment, the two light guide plates 120 positioned adjacent to each other in the first direction may have the same length L1 and L2. Alternatively, three light guide plates 120 may be arranged in the first direction, and the three light guide plates 120 may have the same length or different lengths.

Each light guide plate 120 may have a first region A2, and the first region A2 may have a plurality of second regions A3 that may operate as independent regions. In this embodiment, the first region A2 is divided into four second regions A3. Other arrangements may also be appropriate.

Light may be separately emitted by each of the second regions A3 by individual operation of the respective LEDs 117 providing light to the respective second regions A3. Also, light may be emitted by all of the first region A2 by operation of the respective LEDs 117 providing light to all of the second regions A3 included in the first region A2 at the same time. When the plurality of LEDs 117 disposed in the entire light emitting region are operated at the same time, light may be emitted by all of the plurality of first regions A2 of the respective plurality of light guide plates 120 at the same time. When only a portion of the LEDs 117 providing light to the respective second regions A3 are operated, luminance deviation between the second regions A3 may occur.

In this embodiment, two LEDs 117 emit light in each respective second region A3. However, the number of LEDs 117 corresponding to each second region A3 may be changed according a design of the display device.

The light provided to the first and second regions A2 and A3 may be diffused or transferred to the adjacent first and second regions A3 and A2. Since the plurality of second regions A3 is defined in one light guide plate 120, the second region A3 may not be clearly divided from the adjacent second region A3 due to luminance distribution.

In this embodiment, the LEDs 117 in each of the second regions A3 may be operated by, for example, a local dimming method, an impulsive method, or other method as appropriate. When the plurality of LEDs 117 is operated using the local dimming method, the luminance of the second regions A3 may be adjusted according a gray scale value of an image displayed on the display panel 107. When the plurality of LEDs is operated using the impulsive method, the LEDs 117 may be temporally synchronized with an operation of the display panel 107, and thus, the second regions A3 may be turned on/off.

When the light guide plate 120 is divided into the second regions A3 and operated, a contrast ratio of an image displayed through the display panel 107 may be improved, and power consumption for operating the LEDs 117 may be reduced.

In alternative embodiments, the light guide plate 120 may have a size equal to that of the respective second regions A3. When the light guide plate 120 has a size equal to that of the respective second regions A3, since the number of the light guide plates 120 increases, an assembling process may become more complicated, and light may leak into a boundary region between adjacent light guide plates 120.

The LED 117 may be positioned at a lateral surface of the light guide plate 120 so that light emitted by the LED 117 is incident into the lateral surface of the light guide plate 120 and radiated to a top surface of the light guide plate 120. In the above-described structure, light emitted through the light guide plate 120 may have uniform luminance, and may be substantially improved when compared to a structure in which an LED is disposed beneath a light guide plate so that light radiated by the LED is incident on the bottom surface of the light guide plate and radiated from a top surface of the light guide plate. Thus, the structure shown in FIG. 3 may eliminate the need for the diffusion sheet of the optical sheet 103, or a distance G1 between the optical sheet 103 and the light guide plate 120 may be reduced.

The LED 117 is disposed on the module substrate 110, which may be disposed below the overlap region B1 of the light guide plate 120. The module substrate 110 supports the LED 117 so that the LED 117 is positioned at the lateral surface of the light guide plate 120. The respective module substrates 110 are disposed below the plurality of light guide plates 120 arranged in the first direction.

For example, as shown in FIG. 3, the LED 117 on the first module substrate 111 is positioned below the second light guide plate 122 and the seventh light guide plate 127 to provide light to a portion of the first light guide plate 121 overlapping the second light guide plate 122, and to a portion of the sixth light guide plate 126.

Similarly, the LED 117 on the second module substrate 112 is positioned below the third light guide plate 123 and the eighth light guide plate 128 to provide light to a portion of the second light guide plate 122 overlapping the third light guide plate 123, and to a portion of the seventh light guide plate 127 overlapping the eighth light guide plate 128.

Likewise, the LED 117 on the third module substrate 113 is positioned below the fourth light guide plate 124 and the ninth light guide plate 129 to provide light to a portion of the third light guide plate 123 overlapping the fourth light guide plate 124, and to a portion of the eighth light guide plate 128 overlapping the ninth light guide plate 129.

The LED 117 on the third module substrate 114 is disposed below the fifth light guide plate 125 and the tenth light guide plate 130 to provide light to a portion of the fourth light guide plate 124 overlapping the fifth light guide plate 125, and to a portion of the eighth light guide plate 128 overlapping the ninth light guide plate 129.

The LED 117 on the fifth module substrate 114 is positioned below a case or a bottom cover of the display device 100 to provide light to a portion of the fifth light guide plate 125 overlapping the case or the bottom cover and a portion of the tenth light guide plate 130 overlapping the case or the bottom cover.

Since a portion of the light guide plate 120 overlaps an adjacent light guide plate 120, movement of the light guide plate 120 may be reduced. Specifically, when the overlapping regions B1 are adhered to each other using, for example, a transparent adhesive, movement of the light guide plate 120 may be further reduced.

The module substrate 110 may include a metal core printed circuit board (PCB), a FR-4 PCB, a general PCB, a flexible substrate, or other structure as appropriate. The type of module substrate 110 may be varied within the technical range of this embodiment. The plurality of module substrates 110 may have a bar shape, or a single module substrate 110 may have a rectangular shape and a size corresponding to that of the entire light emitting region of the plurality of light guide plates 120.

The LED 117 may include a colored LED having at least one color, such as, for example, red color, blue color, green color or a white color LED. The arrangement and the emitted light color may be varied as appropriate within the technical range of this embodiment.

Figure 4:
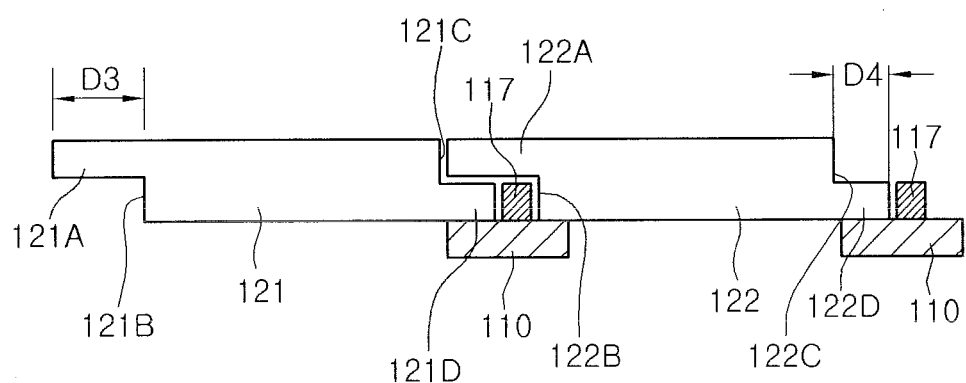
FIG. 4 is a crossed-sectional view of a portion of a light guide plate shown in FIG. 3.

As shown in FIG. 4, upper grooves 121C and 122C may be respectively defined in upper portions of sides of the first and second light guide plates 121 and 122, and lower protrusions 121D and 122D may be respectively provided on lower portions of sides of the first and second light guide plates 121 and 122. Upper protrusions 121A and 122A may be respectively provided on upper portions of the other sides of the first and second light guide plates 121 and 122, and lower grooves 121B and 122B may be respectively defined in lower portions of the other sides of the first and second light guide plates 121 and 122.

Figure 9:
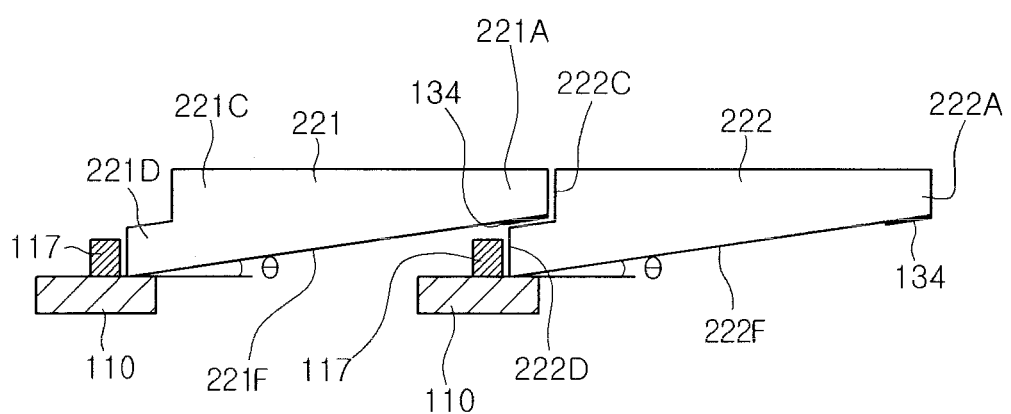
FIG. 9 is a cross-sectional view of a surface light source according to another embodiment as broadly described herein.

In this embodiment, bottom surfaces of the upper protrusions 121A and 122A are parallel to main surfaces of the first and second light guide plates 121 and 122. Alternatively, the bottom surfaces of the upper protrusions 121A and 122A may be inclined with respect to the main surfaces of the first and second light guide plates 121 and 122, as shown in FIG. 9.

The lower protrusion 121D of the first light guide plate 121 may partially overlap the upper protrusion 122A of the second light guide plate 122. The LED 117 may be positioned between the lower protrusion 121D of the first light guide plate 121 and the lower groove 122B of the second light guide plate 122. The lower protrusions 121D and 122D of the first and second light guide plates 121 and 122 may serve as light incident parts through which the light is incident from the LED 117.

For example, the upper protrusions 121A and 122A of the first and second light guide plates 121 and 122 may have a length D3 of about 7.5 mm to about 10 mm. The lower protrusions 121D and 122D of the first and second light guide plates 121 and 122 have a length D4 less than that D3 of the upper protrusions 121A and 122A. The LEDs 117 are positioned at lateral surfaces of the lower protrusions 121D and 122D of the first and second light guide plates 121 and 122.

Figure 5:
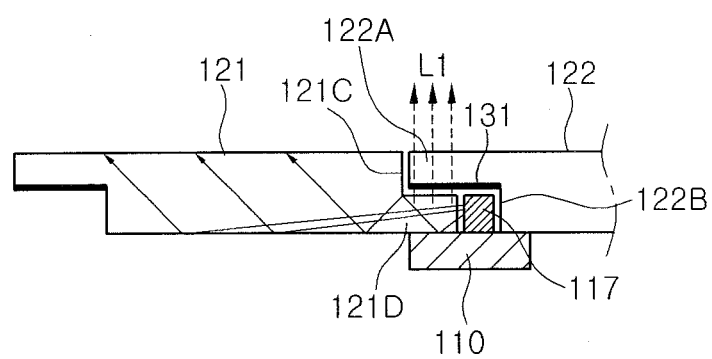
FIG. 5 is a cross-sectional view of a surface light source according to an embodiment as broadly described herein.

In the surface light source shown in FIG. 5, a reflective member 131 may be disposed on bottom surfaces of upper protrusions 121A and 122A of the first and second light guide plates 121 and 122. The reflective member 131 may be, for example, a reflective sheet or a reflective coating material. The reflective member 131 intercepts light L1 progressing toward a direct upper side of the upper protrusion 122A from light radiated by an LED 117 to prevent a hot spot from occurring. The reflective member 131 may also include a light scattering material.

Figure 6:
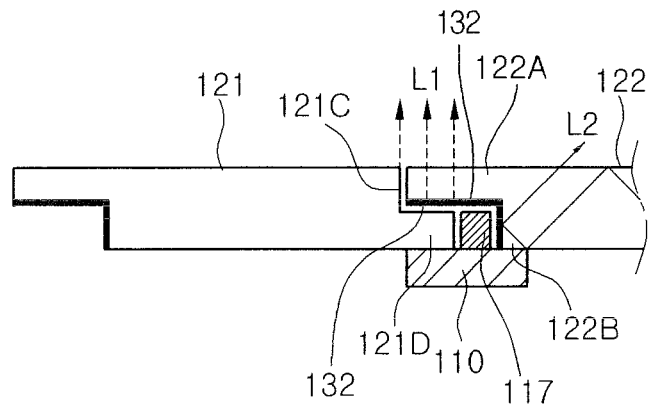
FIG. 6 is a cross-sectional view of a surface light source according to another embodiment as broadly described herein.

In the surface light source shown in FIG. 6, a reflective member 132 may be positioned on bottom surfaces of upper protrusions 121A and 122A of the first and second light guide plates 121 and 122 and surfaces of the lower grooves 121B and 122B. The reflective member 132 provided on the bottom surface of the upper protrusion 122A of the second light guide plate 122 intercepts light L1 progressing toward a direct upper side of the upper protrusion 122A from light radiated by an LED 117 to prevent a hot spot from occurring. The reflective member 132 provided on the surface of the lower groove 122B of the second light guide plate 122 intercepts light L2 incident into the second light guide plate 122, but not incident into the first light guide plate 121 from light radiated by the LED 117 to reduce light leakage into the adjacent light guide plate. The reflective member 132 may include a light scattering material.

Figure 7:
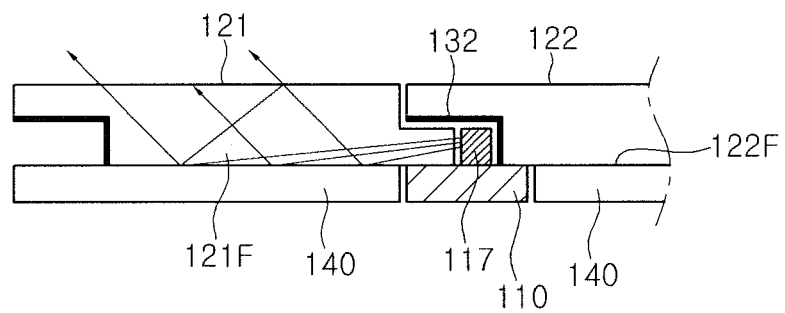
FIG. 7 is a cross-sectional view of a surface light source according to another embodiment as broadly described herein.
Figure 8:
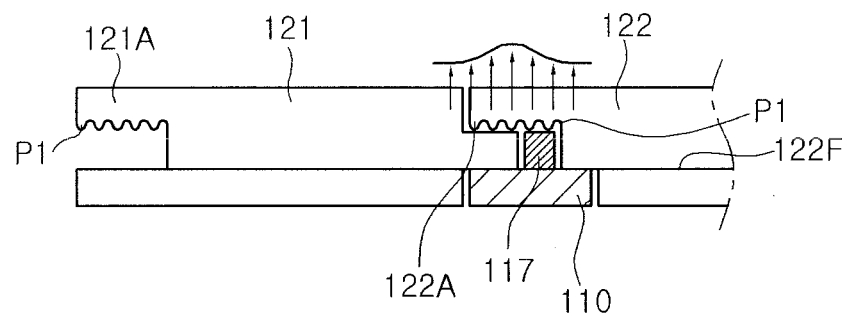
FIG. 8 is a cross-sectional view of a surface light source according to another embodiment as broadly described herein.

In the surface light source shown in FIG. 7, a reflective plate 140 may be provided below the first and second light guide plates 121 and 122 to reflect light leaked into bottom surfaces 121F and 122F of first and second light guide plates 121 and 122. In the surface light source shown in FIG. 8, a predetermined reflective pattern P1 may be provided on bottom surfaces of the upper protrusions 121A and 122A of the first and second light guide plates 121 and 122. The reflective pattern P1 may be formed when the light guide plates 121 and 122 are injection-molded, or may be formed by performing a separate cutting process. The reflective pattern P1 may have a pattern shape through which a portion of light leaked upwardly from an LED passes while the remaining light is reflected.

Luminance distribution B4 in a boundary region between the first and second light guide plates 121 and 122 may be adjustable such that the luminance distribution B4 has a different value within a critical range when compared to the other region, thereby reducing a hot spot.

FIG. 9 is a view of a surface light source in accordance with another embodiment as broadly described herein. In the embodiment shown in FIG. 9, bottom surfaces 221F and 222F of first and second light guide plates 221 and 222 are inclined at a predetermined angle θ from first sides 221D and 222D to second sides 221A and 222A of the light guide plates 221 and 222 with respect to main surfaces thereof. A thickness of the first and second light guide plates 221 and 222 may become gradually thinner from the first sides 221D and 222D to the second sides 221A and 222A. As shown in FIG. 9, the first side 221D of the first light guide plate 221 protrudes toward a light incident part, and the second side 221A of the first light guide plate 221 overlaps the first side 222D of the second light guide plate 222.

A reflective member 134 such as, for example, a reflective sheet or a reflective coating material, may be provided on bottom surfaces of the second sides 221A and 222A of the first and second light guide plates 221 and 222. The reflective member 134 intercepts light leaked into a boundary region between the first and second light guide plates 221 and 222 to prevent a hot spot from occurring.

Embodiments may provide a light unit having a novel structure and a display device including such a light unit.

Embodiments may provide a light unit, which may be controlled in a partial operation method and easily assembled, and a display device including such a light unit.

Embodiments may provide a light unit having uniform luminance distribution and a display device including such a light unit.

Embodiments may provide a display device having a slim size.

A light unit having a novel structure and a display device including the light unit are provided.

A light unit, which may be controlled in a partial operation method and easily assembled, and a display device including the light unit are provided.

A light unit having uniform luminance distribution and a display device including the light unit are provided.

A display device having a slim size is provided.

In one embodiment, a light unit as broadly described herein may include light guide plates in which N light guide plates are disposed in a first direction and M light guide plates are disposed in a second direction perpendicular to the first direction, wherein the number M is greater or equal to the number N; light emitting diodes (LEDs) disposed below the light guide plates to provide light lateral surfaces of the light guide plates; and module substrates supporting the LEDs and providing a power, wherein the respective light guide plates include a first region and second regions in which the first region is divided into a plurality of regions, and the LEDs are operated in each of the second regions as a unit operation region.

In another embodiment, a display device as broadly described herein may include a display panel; an optical sheet; light guide plates in which N light guide plates are disposed below the optical sheet in a first direction and M light guide plates are disposed in a second direction perpendicular to the first direction, wherein the number M is greater or equal to the number N; light emitting diodes (LEDs) disposed below the light guide plates to provide light lateral surfaces of the light guide plates; and module substrates supporting the LEDs and providing a power, wherein the respective light guide plates include a first region and second regions in which the first region is divided into a plurality of regions, and the LEDs are operated in each of the second regions as a unit operation region.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light source, comprising:
   a plurality of light guide plates arranged in rows and columns;
   a plurality of light emitting diodes (LEDs) positioned adjacent to the plurality of light guide plates so as to provide light to corresponding lateral surfaces of the plurality of light guide plates, wherein each of the plurality of light guide plates includes a first region divided into a plurality of second regions, and wherein LEDs corresponding to each of the plurality of second regions operate together as a unit such that each of the plurality of second regions is independently controllable; and
   a plurality of reflective members respectively provided on surfaces of the plurality of light guide plates facing the plurality of LEDs, wherein each of the plurality of light guide plates includes:
      an upper protrusion provided along a first edge thereof and extending over LEDs corresponding thereto; and
      a lower protrusion provided along a second edge, opposite the first edge thereof, and extending toward LEDs corresponding thereto,
      wherein the lower protrusion of a first light guide plate and the upper protrusion of a second light guide plate that is adjacent to the first light guide plate face each other, and
      wherein one of the plurality of reflective members is provided on a lower surface of the upper protrusion facing the LEDs corresponding thereto.

2. The light source of claim 1, wherein ends of adjacent light guide plates within a row are closely attached to each other.

3. The light source of claim 1, wherein ends of adjacent light guide plates within a column overlap each other.

4. The light source of claim 1, wherein the plurality of light guide plates are arranged in an entire light emitting region in which a length of a vertical direction is greater than that of a horizontal direction, wherein the rows extend in the horizontal direction, and the columns extend in the vertical direction.

5. The light source of claim 1, wherein the plurality of LEDs provide light to the plurality of second regions of the plurality of light guide plates.

6. The light source of claim 1, wherein LEDs are positioned between corresponding side edges of adjacent first and second light guide plates in a column, and below a portion of the second light guide plate, so as to provide light to the first light guide plate.

7. The light source of claim 1, further comprising a plurality of module substrates that support and provide power to the plurality of LEDs, wherein the plurality of module substrates are respectively positioned below the plurality of light guide plates.

8. The light source of claim 1, wherein each of the plurality of reflective members comprises a reflective pattern formed on the upper protrusion of its respective light guide plate.

9. The light source of claim 1, wherein each of the plurality of reflective members comprises a light scattering layer provided on the upper protrusion of its respective light guide plate.

10. A display device comprising the light source of claim 1.

11. A display device, comprising:
    a display panel;
    an optical sheet;
    a plurality of light guide plates arranged in rows and columns below the optical sheet;
    a plurality of light emitting diodes (LEDs) positioned adjacent to the plurality of light guide plates, wherein each of the plurality of light guide plates includes a first region divided into a plurality of second regions, and wherein LEDs corresponding to each of the plurality of second regions operate together as a unit such that each of the plurality of second regions is independently controllable; and
    a plurality of reflective members respectively provided on surfaces of the plurality of light guide plates facing the plurality of LEDs, wherein each of the plurality of light guide plates includes:
       an upper protrusion provided along a first edge thereof and extending over LEDs corresponding thereto; and
       a lower protrusion provided along a second edge, opposite the first edge thereof, and extending toward LEDs corresponding thereto,
       wherein the lower protrusion of a first light guide plate and the upper protrusion of a second light guide plate that is adjacent to the first light guide plate face each other, and
       wherein one of the plurality of reflective members is provided on a lower surface of the upper protrusion facing the LEDs corresponding thereto.

12. The display device of claim 11, wherein ends of adjacent light guide plates within a row are closely attached to each other, and lateral sides of adjacent light guide plates within a column overlap each other.

13. The display device of claim 11, wherein LEDs are positioned between corresponding side edges of adjacent first and second light guide plates in a column, and below a portion of the second light guide plate, so as to provide light to the first light guide plate.

14. The display device of claim 11, wherein each reflective member comprises a reflective pattern formed on a surface of the upper protrusion of its respective light guide plate.

15. The display device of claim 11, wherein each reflective member comprises a light scattering layer fondled on a surface of the upper protrusion of its respective light guide plate.

16. A display device, comprising:
    a display panel;

an optical sheet; and
a light transmitting structure, comprising:
- a plurality of light guide plates positioned adjacent to each other below the optical sheet;
- a plurality of light emitting diodes (LEDs) positioned adjacent to the plurality of light guide plates, wherein the plurality of LEDs are positioned between corresponding lateral sides of adjacent light guide plates such that light emitted by the plurality of LEDs is incident on a lateral side of a corresponding light guide plate; and
- a plurality of reflective members respectively provided on surfaces of the plurality of light guide plates facing the plurality of LEDs, wherein each of the plurality of light guide plates includes:
  - an upper protrusion provided along a first edge thereof and extending over LEDs corresponding thereto; and
  - a lower protrusion provided along a second edge, opposite the first edge thereof, and extending toward LEDs corresponding thereto,
  wherein the lower protrusion of a first light guide plate and the upper protrusion of a second light guide plate that is adjacent to the first light guide plate face each other, and
  wherein one of the plurality of reflective members is provided on a lower surface of the upper protrusion facing the LEDs corresponding thereto.

17. The display device of claim 16, wherein a space is formed between a lateral side of the lower protrusion of the first light guide plate and a lower portion of the second lateral side of the second light guide plate below the upper protrusion, and wherein corresponding LEDs are positioned in the space folined therebetween.

18. The display device of claim 17, wherein the LEDs positioned in the space emit light toward the lateral side of the lower protrusion of the first light guide plate.

19. The display device of claim 16, each of the plurality of reflective members is provided between the LEDs corresponding thereto and a corresponding surface of the upper protrusion so as to reflect light incident thereon.

20. The display device of claim 16, wherein each reflective member comprises a reflective pattern formed on a surface of the upper protrusion of its respective light guide plate.

21. The display device of claim 16, wherein each reflective member comprises a light scattering layer formed on a surface of the upper protrusion of its respective light guide plate.

* * * * *